United States Patent [19]
Portnoy

[11] 3,816,919
[45] June 18, 1974

[54] MEANS FOR CUTTING NERVE TISSUE

[76] Inventor: Harold D. Portnoy, 1431 Woodward, Bloomfield Hills, Mich. 48013

[22] Filed: June 28, 1972

[21] Appl. No.: 267,029

[52] U.S. Cl.................................. 30/124, 128/305
[51] Int. Cl...................... A61b 19/00, B26b 11/00
[58] Field of Search...... 30/124, 286, 289; 128/305, 128/325; 269/1, 322, 321 N

[56] References Cited
UNITED STATES PATENTS
3,492,994   2/1970   Field................................ 128/305

Primary Examiner—James L. Jones, Jr.
Assistant Examiner—J. C. Peters
Attorney, Agent, or Firm—Donald D. Mon

[57] ABSTRACT

Means for accurately cutting nerve tissue. A fixture has a body with first and second spaced-apart arms which respectively bear first and second sidewall surfaces. A bottom surface extends between the sidewall surfaces, thereby to form an open-topped channel. A retention slot extends through the bottom surface from one end of the channel, and a guide slot extends into each of the said arms, the guide slots being aligned across the channel and directed into it. Nerve tissue can be folded into a fold of elastomer such as silicone rubber, and this material can be passed through the retention slot pulled down so as to stretch it and to bring the enfolded nerve tissue against the bottom of the channel. The thickness of the guide slot and of the material are so related that when the stretched material is released, it expands to fill the slot and holds itself and the nerve tissue in position. Then a cutting blade, guided by the aligned guide slots, can be brought against the nerve tissue accurately to cut it. The fixture is small enough to enter small incisions, is readily sterilizable, and is inexpensive enough to be discarded after each use.

10 Claims, 6 Drawing Figures

PATENTED JUN 18 1974   3,816,919
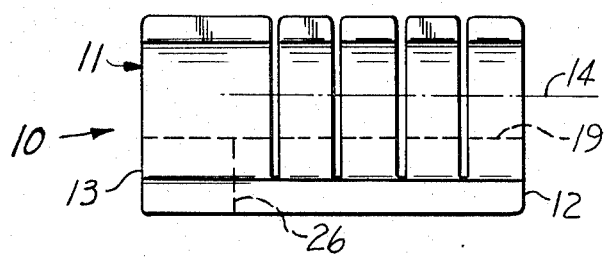
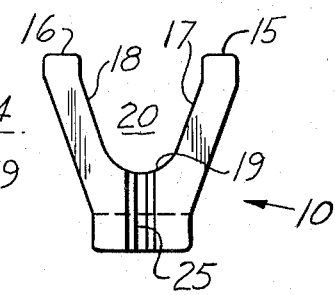
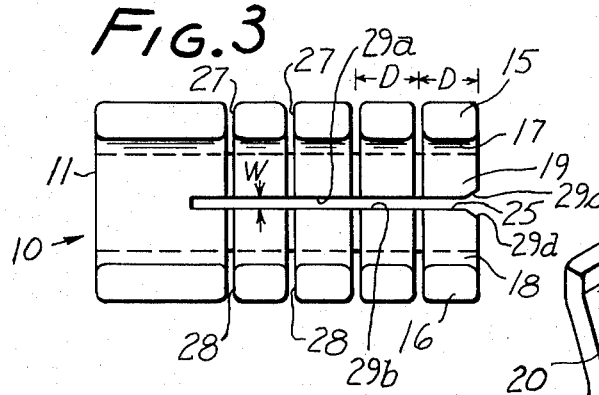
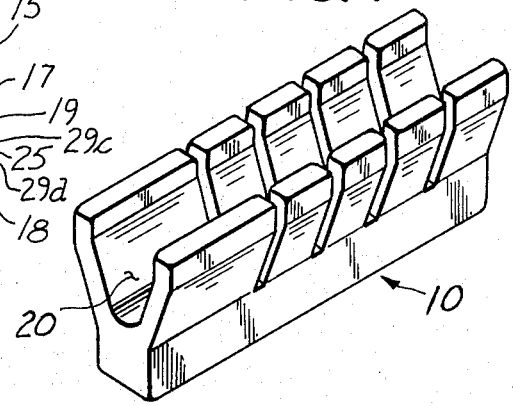
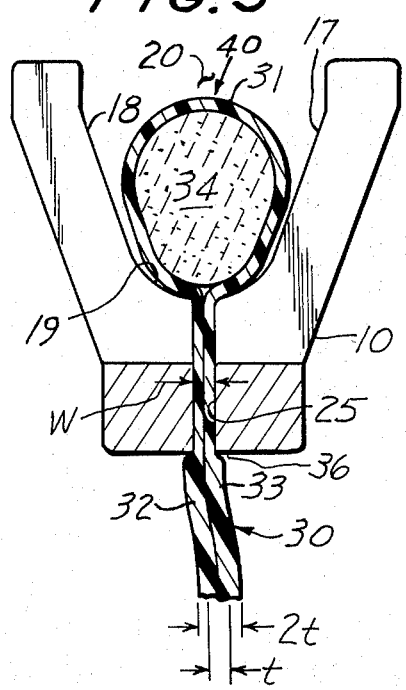
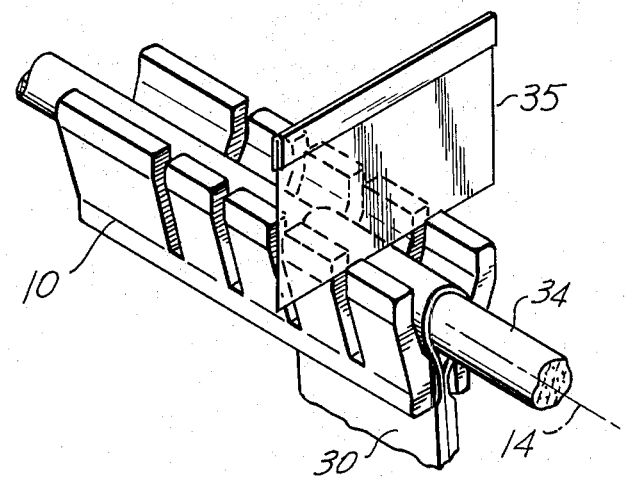

MEANS FOR CUTTING NERVE TISSUE

This invention relates to a means for accurately cutting nerve tissue, and in particular to an inexpensive, small and readily sterilized fixture for this purpose.

Nerve tissue is small in size, is extended in length like spaghetti, and moist. It is therefore, difficult to handle. In neurological procedures, where a cut or damaged nerve is to be resected, it is essential for best results to have abutting surfaces with accurately planar surfaces. Because of the soft and slippery nature of the small nerve tissue, it has heretofore been difficult to easily obtain accurate cuts. This is especially true when the cuts must be made within the boundaries of small incisions.

Furthermore, it is necessary that the resection be made at faces which have only healthy tissue, and it is necessary to begin with the damaged or diseased tissue and to cut back along the nerve until totally healthy tissue exists at the cut face. It is an object of this invention to provide means for making accurate cuts, and for stepping back along the nerve tissue in small dimensional increments until totally healthy tissue is uncovered at the cut face.

It is an object of this invention to provide a small fixture which can be used independently of other mechanisms, and which can fit in small incisions, and in which the nerve can be held to the fixture without bulky tools such as hemostats. In the prior art as exemplified by an article in the Plastic and Reconstructive Surgery. 44:605, 1969, there is shown a miter box for a similar purpose. However, in order for it to function at all, it must be and is made integral with a hemostat, thereby constituting a bulky device which is difficult to handle in an operating field. However, without the attached hemostat, there is no way disclosed to hold the nerve in the miter box. Furthermore, material described as "plastic" is used to draw the nerve tissue into the miter box. Such material deflects when it is cut, and prevents an accurate planar cut from being made.

In contrast, the elastomer used in this invention is elastic and extensible, so that when it is stretched to pull it into the slot in the fixture, it has been drawn down to a lesser thickness. When it is released, it springs back toward its initial thickness and holds itself and the nerve tissue in place, and the fixture can be made of minimum size. Furthermore, the material cuts like butter, without substantial deformation, and thereby enables a square, truly planar end face to be cut on the nerve tissue.

A fixture for cutting nerve tissue according to this invention comprises a unitary body having a first and second end. A first and second arm are carried by the body, and these carry a first and a second sidewall surface, respectively. A bottom surface extends between the first and second sidewall surfaces so as to form an open-topped channel which has a longitudinal axis along which the nerve tissue can be laid. A longitudinally-extending retention slot passes through the body and the bottom surface, and is open at one end of the channel, but not at the other. It has a reference width. A guide slot is formed in each of said arms, the guide slots being aligned across the channel. Nerve tissue may be folded into a fold of an elastic and extensible material, the folded material having a relaxed thickness which is greater than one-half the reference width of the slot. The two edges of the folded material are pulled into the retention slot and stretched down to bring the wrapped nerve tissue against the bottom surface. When the material is released, it springs back toward its relaxed thickness and holds itself in the slot. A cutting blade can then be passed through the guide slots accurately to cut the tissue, without requiring external holding devices such as clamps or hemostats.

According to a preferred but optional feature of the invention, a plurality of pairs of guide slots are provided at spaced-apart locations along the axis.

According to still another preferred but optional feature of this invention, the material of the sheet is an elastomer.

The invention will be fully understood from the following detailed description and the accompanying drawings in which:

FIG. 1 is a side elevation of a fixture according to the invention;

FIG. 2 is a right-hand end view of FIG. 1;

FIG. 3 is a top view of FIG. 1;

FIG. 4 is a perspective view of the device of FIG. 1;

FIG. 5 is a cross-section taken at line 5—5 of FIG. 6; and

FIG. 6 is a perspective view of the device showing nerve tissue being cut.

In FIG. 1 the presently preferred embodiment of fixture 10 is shown. The fixture has a body 11 with a first and a second end 12, 13 respectively. It has a longitudinal axis 14. As best shown in FIG. 2, a first arm 15 and a second arm 16 are formed on the body, the arms branching apart from one another as they extend upwardly. They carry first and second sidewall surfaces 17, 18, respectively, and are joined by an arcuate bottom surface 19. The sidewall surfaces and bottom surface form between them a curve-bottomed open-topped channel 20 which extends along longitudinal axis 14.

A retention slot 25 passes through the body from the bottom surface and extends from the first end into the body, terminating at an end wall 26. The retention slot extends longitudinally and is open at end 12, but not at end 13. At least one guide slot 27, 28 is formed in each of the first and second arms, respectively. The guide sots are aligned across the open-topped channel in pairs, and preferably there is a plurality of these pairs, which are spaced apart incrementally along the longitudinal axis by dimension "D", which dimension may be of any size suitable for stepwise sectioning of nerve tissue, such as 1 or 2 mm. The planes of the aligned pairs of guide slots are normal to the longitudinal axis, and therefore to the axis of the nerve tissues, as it bears against the bottom of the open-topped channel. In this manner, an absolutely square cut can be assured.

The walls 29a, 29b of the retention slot are spaced apart by a reference width "W".

Chamfer surfaces 29c, 29d are formed at the open ends of the slot.

A sheet 30 of elastic and extensible material is used to hold the nerve tissue in place. By "elastic" is meant a material which can be lengthened by pulling on it, and which will tend to restore itself to its original shape when the force is released. By "extensible" is meant a material which, when elongated such as by pulling on it, will reduce in cross-section area. The sheet has a reference thickness "t" in its relaxed, i.e., unstretched or uncompressed, condition. Dimension "t" is greater than one-half dimension "W", so that two thicknesses of the sheet in their relaxed condition cannot be placed in the retention slot. However, the material can be stretched so as to thin down to a thickness less than one-half the width W of the slot and be pulled into the retention slot. The chamfers provide lead-in assistance for the stretched sheets.

FIGS. 5 and 6 show the fixture in use. Sheet 30 is folded so as to form a bight 31 and two folds 32, 33. Nerve tissue 34 is enfolded between the folds and held in the bight. The folds are then stretched and led into the retention slot and then pulled down so as to snug the enfolded nerve tissue against the bottom of the channel. The nerve tissue and the material which embraces it comprise an enfoldment 40 (FIG. 5). The stretching forces on the sheet are then released, and the sheet elastically tends to restore itself to its original thickness. In so doing, it presses against walls 29a and 29b, and forms an enlarged shoulder 36 contiguous to the bottom of the fixture. Now the nerve tissue is firmly held in place and may be sectioned by a cutting blade 35 by pressing it downwardly to cut through both the flexible material and through the nerve tissue at any selected aligned pair of guide slots. The nerve tissue will, therefore, be squarely cut, and may be incrementally cut by using one pair of guide slots after another until totally healthy tissue appears at the end. The guide slots extend downwardly at least to the bottom surface, and preferably extend somewhat below it, as best shown in FIG. 2, so that the tissue will be fully cut.

The presently preferred material for sheet 30 is silastic elastomer, commonly known as silicone rubber. Such a material cuts with minimal indentation or deflection, rather like butter, and does not push the nerve tissue out of shape when pressed by the blade. Different elastic and extensible materials may be used which have this property. Speaking generally, this property is most common to elastomers, and these represent the preferred material.

This invention provides a means for securely gripping slippery tissue, holding it fixed during a cutting operation to make a square cut, and in the preferred embodiment, for making accurate incremental cuts until totally healthy nerve tissue is exposed. The fixture may be made inexpensively of plastic material that can readily be sterilized, and which can economically be discarded after use. Because of the self-retentive feature of the sheet and retention slot, the fixture can be made small enough to fit into a small incision, where a fixture attached to a hemostat, or which requires a hemostat or clamp to hold the sheet in place, will not fit.

This invention is not to be limited by the embodiment shown in the drawings and described in the description, which is given by way of example and not of limitation, but only in accordance with the scope of the appended claims.

I claim:

1. In combination: a sheet of elastic and extensible material having a relaxed thickness; and a fixture for cutting nerve tissue comprising a body, a first and second arm on said body carrying a respective first and second sidewall surface and a bottom surface extending between said first and second sidewall surface so as to form an open-topped channel having a longitudinal axis, a longitudinally extending retention slot passing through the body from the bottom surface and open at one longitudinal end of the channel, but not at the other, the retention slot having a reference width less than twice the relaxed thickness of the material, and a guide slot in each of said arms, and extending into said arms at least to the bottom surface, said guide slots being aligned with each other to form an aligned pair, whereby nerve tissue may be enfolded between two folds folded in a fold of the material to form an enfoldment comprising the nerve tissue and embracing material, the folds of the material being stretched and thereby thinned and brought through the retention slot so as to pull the enfoldment against the bottom surface, the stretching forces on the material then being released so the material tends to return toward its relaxed thickness and hold itself in the retention slot, and a cutting blade may thereafter be passed into the guide slots to cut the nerve tissue.

2. A combination according to claim 1 in which a plurality of said aligned pairs of guide slots is formed, spaced apart along the axis.

3. A combination according to claim 1 in which the plane of each of the guide slots lies normal to the longitudinal axis, whereby the nerve tissue is cut normally to its own axis.

4. A combination according to claim 3 in which a plurality of said aligned pairs of guide slots is formed, spaced apart along the axis.

5. A combination according to claim 4 in which the slots are spaced apart uniformly along the said axis.

6. A combination according to claim 1 in which the material is silicone rubber.

7. A combination according to claim 6 in which a chamfer is formed in the body at the open end of the retention slot.

8. A combination according to claim 1 in which a chamfer is formed in the body at the open end of the retention slot.

9. A combination according to claim 1 in which the material is an elastomer.

10. The combination of claim 1 further including a cutting blade for insertion into aligned guide slots to cut the nerve tissue.

* * * * *

UNITED STATES PATENT OFFICE
CERTIFICATE OF CORRECTION

PATENT NO. : 3,816,919
DATED : June 18, 1974
INVENTOR(S) : HAROLD D. PORTNOY

It is certified that error appears in the above-identified patent and that said Letters Patent are hereby corrected as shown below:

Col. 2, line 44,     "sots" should read --slots--

Col. 4, line 7,     "surface" should read --surfaces--
(Cl. 1, line 6)

Col. 4, line 18,     "folds folded in a fold of the material"
(Cl. 1, line 17)     should read --folds of the material--

Signed and Sealed this seventh Day of October 1975

[SEAL]

Attest:

RUTH C. MASON
Attesting Officer

C. MARSHALL DANN
Commissioner of Patents and Trademarks